DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 31, 1971

889 O.G. 1363

T889,007

REDUCTION OF TAR AND NICOTINE YIELDS IN THE COMBUSTION OF CIGARETTE TOBACCO

George P. Touey, 2221 Swannanoa Ave. 37664, and Thomas H. Larkins, Jr., 300 Stuffle St. 37600, both of Kingsport, Tenn.

Filed May 11, 1970, Ser. No. 36,450
Int. Cl. A24b *15/02*
U.S. Cl. 131—17
No Drawing. 12 Pages Specification

A smoking mixture containing a major portion of tobacco and having substantially uniformly distributed in the tobacco a minor portion of a hydrated calcium aluminate or hydrated calcium carboaluminate additive which functions to substantially reduce the amount of tar and nicotine produced on combustion of the tobacco in a smoking cycle. The additive may comprise 2–10 percent by weight of the total weight of tobacco and additive.